United States Patent [19]

Wheat

[11] 3,764,749

[45] Oct. 9, 1973

[54] TELECOMMUNICATION EXCHANGE USING CORDS AND SUPERHIGHWAYS

[75] Inventor: Jeffrey Malcolm Wheat, Sherwood, Nottingham, England

[73] Assignee: Plessey Handel Und Investments AG, Zug, Switzerland

[22] Filed: May 3, 1972

[21] Appl. No.: 249,904

[52] U.S. Cl. .......................... 179/15 A, 179/15 AT

[51] Int. Cl. .......................... H04j 3/04

[58] Field of Search .................... 179/15 AT, 15 A, 179/15 BA, 15 BS, 18 J

[56] References Cited

UNITED STATES PATENTS 3,479,466 11/1969 Damiano .......................... 179/18 J

*Primary Examiner*—Ralph D. Blakeslee

*Attorney*—Scrivener, Parker, Scrivener & Clarke

[57] ABSTRACT

In a telecommunication exchange having a receive and a transmit time-shared superhighway operated respectively on the odd and even time slots of a common time cycle, a call requires an odd time slot, an even time slot, a store and a pairing memory. A cord has stores which are read cyclically during the odd time slots, and in a variable sequence during the even time slots depending on store identities read from pairing memories during odd time slots. The store allocated to a call corresponds to the odd time slot in use, and the identity of the allocated store is written into the pairing memory of the odd time slot preceding the even time slot allocated to the call. Erasure of the pairing memory at the end of a call is simplified, according to the invention, by a repeat selector RS which, during an even time slot E and in response to a clear down signal 27 at gate g6, causes a decoder D to reselect the allocated pairing memory in readiness for a write zero signal developed on the opening of gate g9.

1 Claim, 3 Drawing Figures

Patented Oct. 9, 1973 3,764,749

3 Sheets-Sheet 1

TELECOMMUNICATION EXCHANGE USING CORDS AND SUPERHIGHWAYS

This invention relates to telecommunication exchanges of the type which use apparatus known as cords to connect calls over receive and transmit time-shared superhighways.

In such an exchange, a store in a cord is connected to the orginating and called parties of a call at odd and even time slots respectively of a cycle of time pulses. A call requires a first or odd time slot, a second or even time slot, and a store in which go speech is stored from the first to the second time slot and return speech for the remainder of the time cycle. The first and second time slots used for a call are determined by traffic conditions, with the result that the relationship between the two time slots in the time cycle is fortuitous, except in so far as the first time slot is odd and the second time slot is even.

A store used by a call is one of a number of stores in a cord assigned to the call. A cord has a selector by which its stores may be selected one at a time. When a store is in use for a call, it is selected twice in each time cycle: once at the first time slot for connection (indirectly) to the orginating party, and again at the second time slot for connection (indirectly) to the called party. When a store is selected, the speech signals stored in the store are read out and applied to the transmit superhighway, after which a speech signal from the receive superhighway is written into the store. A cord enables any pair of odd and even time slots to be used for a call. A cord has a store corresponding to each odd pulse of the time cycle. During the odd pulses the selector selects the stores under the control of a counter, each store being selected in the time slot to which it corresponds. In the intervals between odd pulses — that is, during even pulses — the selector again selects the stores one at a time. However, during the even pulses, the selector is not controlled by the counter. A store has a pairing memory relating to the even pulse following the odd time slot to which the store corresponds. When an even time slot is chosen for a call, the identity of the odd time slot in use for the call is written into the pairing memory relating to the chosen even time slot. A pairing memory is read in the odd pulse preceding the even pulse to which it relates, and its output is used to control the selector during the even pulse concerned. For example, if a call is received on a receive superhighway at time slot 3, the third store of the cord is used for the call. And if the even time slot 6 is chosen for the forward routing of the call; "3" is written into the sixth pairing memory. Then at time slot 3, the third store is selected under control of the counter for connection to the originating party. At time slot 5, the fifth store is selected, and the pairing memory for time slot 6 is read non-destructively, the "3" already written in the memory being read out and passed to the selector. At time slot 6, the selector selects the third store for connection to the called party. The entry in the pairing memory is erased when the call terminates.

The present invention offers a new method of performing this erasure.

According to the invention there is provided a telecommunication exchange which includes a receive and a transmit time-shared superhighway operated on a common cycle of time pulses, and at least one cord comprising a store corresponding to each odd time slot of the cycle, each store having a pairing memory relating to the even time slot following the odd time slot to which the store corresponds, a call through the exchange requiring an odd time slot, an even time slot and a store; in which exchange a cord also comprises a cyclic counter having a stage corresponding to each store of the cord, a selector capable of storing a count supplied by the counter, and a decoder responsive to a count supplied by the counter to the selector to read during an odd time slot the store identified by the count, the selector being also capable of storing a further count delivered thereto from a pairing memory on the read out of a store, the decoder being also responsive to the further count to read, during the even time slot following the odd time slot in which the further count was read out, the store identified by the further count; in which exchange a cord additionally comprises a repeat selector capable of storing a count supplied by the counter to the selector, and pairing erasure means responsive to an erase signal read from a store during an even time slot to inhibit the response of the decoder to said further count, to cause the decoder to respond to the count stored in the repeat selector, and to deliver a signal to the stores of the cord whereby zero is written into the pairing memory of the store identified by the count in the repeat selector.

The invention will now be described with reference to the accompanying drawings in which.

Figure 1:
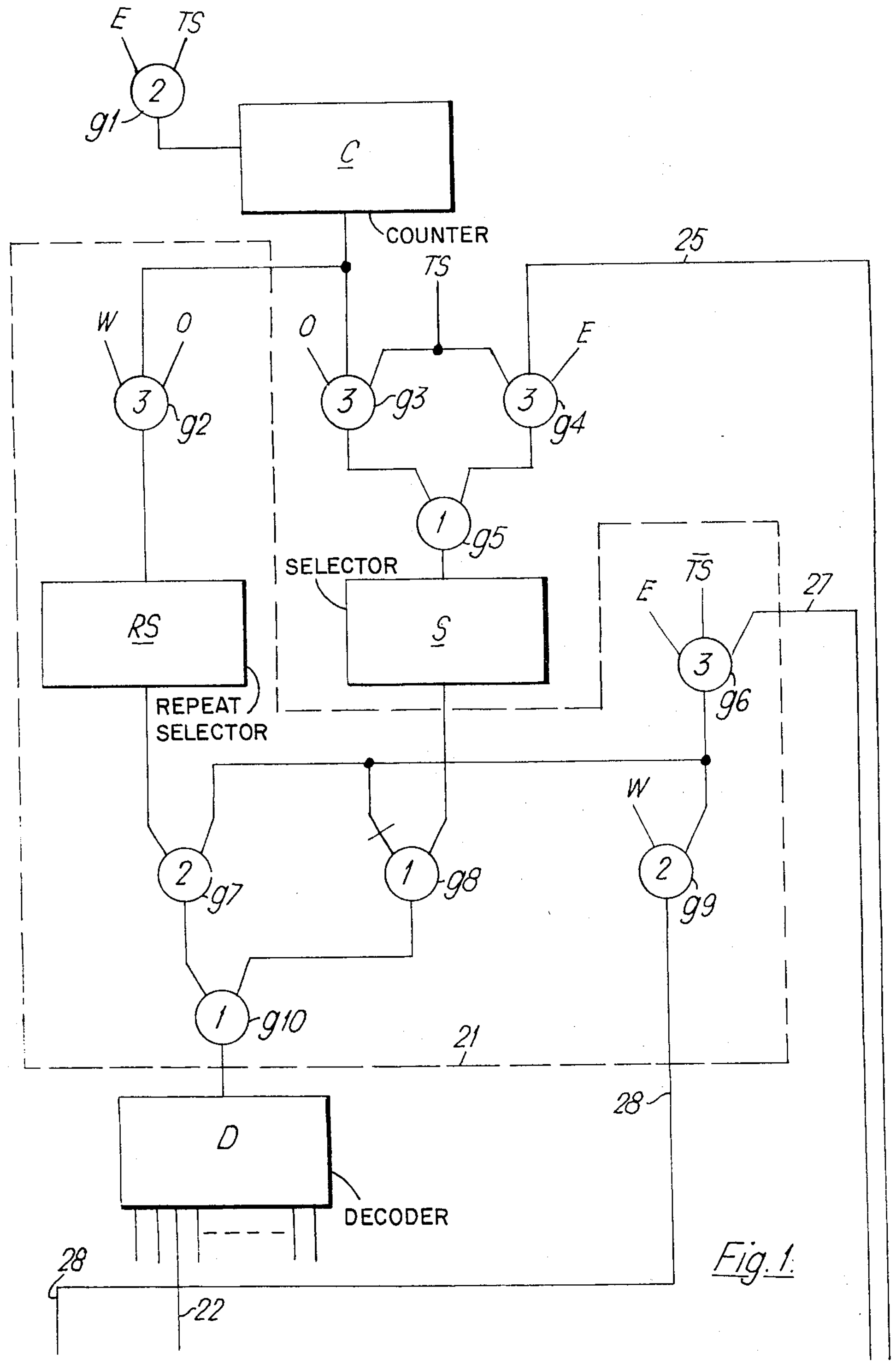
FIG. 1 shows schematically parts of a cord concerned with store selection.

In FIG. 1 only those parts of a cord that are relevant to the present invention are shown. The cord functions in the well-known way, except in so far as relates to new equipment provided according to the invention, and which is enclosed within the broken line 21. A cord has a store corresponding to each odd time slot O of the pulse cycle used to operate the superhighways. Each store bears the number of the odd time slot to which it corresponds. A counter C has a stage corresponding to each store, the stages being identified by the odd numbers borne by the stores. The counter C advances one stage each time the gate *g*1 opens, that is at each even time slot E. The count in the counter is delivered by gates *g*3, *g*5 to a selector S. The selector S is a temporary store of any suitable construction, and is used to select the stores of the cord one at a time. A count may also be delivered to the selector S by way of a gate *g*4. A count in the selector S is passed by a normally open inhibit gate *g*8 and an OR gate *g*9 to a decoder D. The decoder D decodes the count, and applies a signal over an output lead 22 individual to the store represented by the count.

Figure 2:
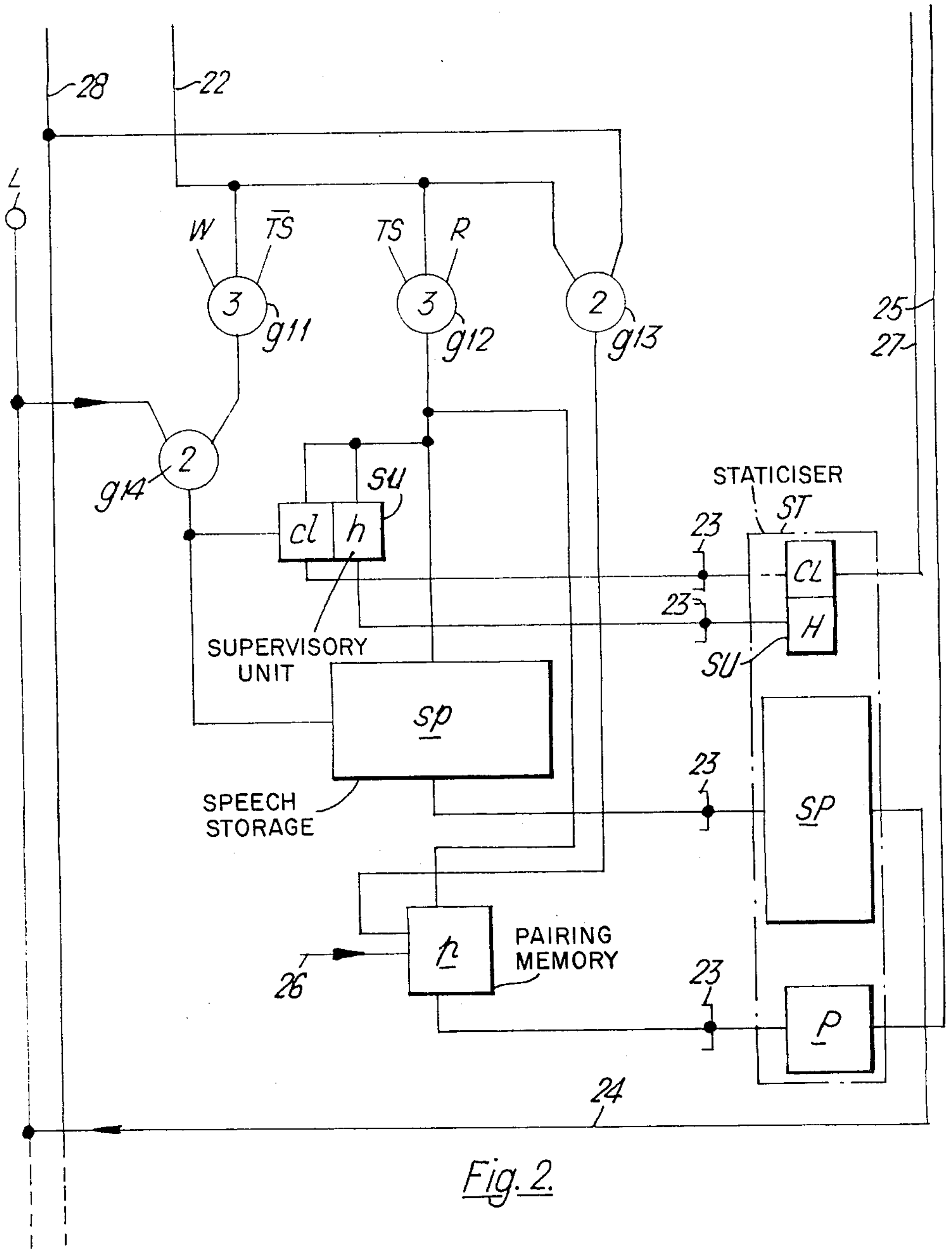
FIG. 2 shows schematically parts of a typical store and parts of a store output staticiser common to the stores of a cord.

When a store in a cord is used for a call, its purpose is to store speech signals between the time slots used by the call. The store is connected to the originating and called parties at odd and even pulses respectively of a time cycle (see FIG. 3). Hence each call requires an odd time slot, an even time slot and a store. The speech signals are stored in a speech storage unit *sp* (FIG. 2) which can be read out or written into on the opening of gates *g*11, *g*12 respectively. A cord has a store corresponding to each odd pulse of the cycle. Also provided is a staticiser ST, used in common by all the stores of a cord, as indicated by the multiple points 23. The staticiser has a component SP in which speech signals are received when a speech storage unit *sp* is read. By means of a lead 24 and a link L, speech signals are passed as required from the staticiser component SP to a transmit superhighway (not shown). The link L is common to all the stores of the cord, and also serves to pass speech signals from a receive superhighway (not shown) to a gate *g*14 for writing into a speech storage unit *sp*. Each store also has a supervisory unit *su*, which is operable to either a clear down condition *cl* or a hold condition *h* in dependence on the state of the originating party's receiver rest. The staticiser ST has a corresponding component SU. The cord also has a pairing memory *p* corresponding to each even time slot. A pairing memory *p* is read during the preceding odd time slot, its contents being staticised in a component P of the staticiser ST. Although the pairing memory *p* in FIG. 2 is read at the same odd time slot as the supervisory unit *su* and speech storage unit *sp*, its contents relate to the following even time slot. The content of the pairing memory *p* is a count indicating which store is to be read in the even time slot. A lead 25 is therefore taken from the component P to the gate *g*4, whence the counter concerned is delivered in the selector S.

Conforming to known practice, the lead 25 comprises a number of parallel conductors, over which a count is transmitted, as a complex parallel signal in two-out-of-five or other suitable code. The count in the counter C is delivered in the adopted code, and the selector S, the repeat selector RS (to be mentioned later) and the decoder D are all arranged to receive the code. Accordingly the gates *g*2 – *g*5; *g*7, *g*8, *g*10 are not single gates, but each represent a group of gates, the number of gates in a group being equal to the number of parallel conductors needed to carry the adopted code. Information in the counter C, the selector S, the repeat selector RS, the decoder D, the supervisory unit *su*, the speech storage unit *sp*, the pairing memory *p* and the corresponding components SU, SP, P of the staticiser ST is changed by over-writing. Stored information is erased by over-writing zero.

Figure 3:
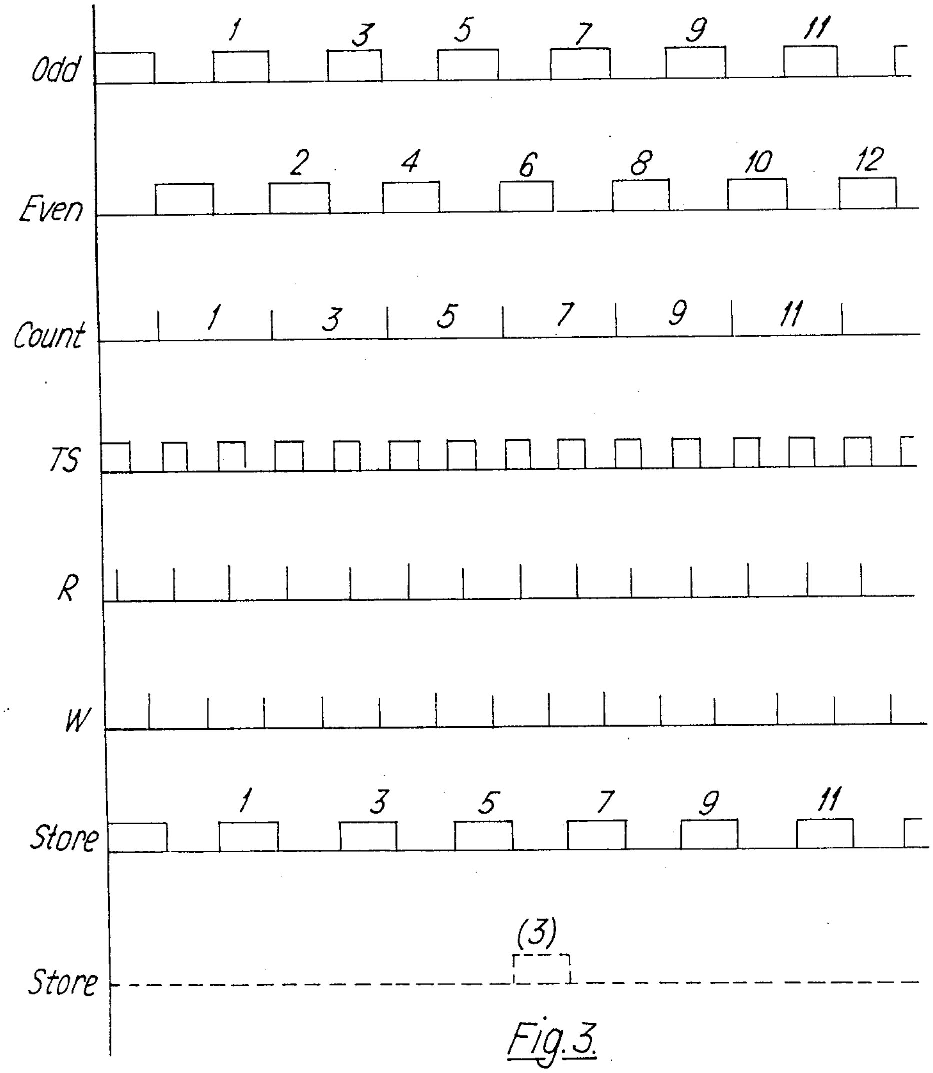
FIG. 3 is a pulse chart showing pulses used in operating a cord.

The cord is operated conventionally using the pulse trains shown in FIG. 3. A cord has a store corresponding to each odd time slot of the time cycle. For ease of reference a store bears the number of the odd time slot to which it corresponds. During the first half of each time slot, store is connected to a transmit superhighway by means of a pulse TS. This pulse is absent in the second half of the time slot. During the absence, a signal $\overline{TS}$ (not shown in FIG. 3) is developed. During the second half of the time slot, the store is connected to a receive superhighway. During each pulse TS, there is delivered a read pulse R, whose primary function is to read out the contents of the speech storage unit *sp* and apply them by way of the staticiser ST to the link L and thence to a transmit superhighway. Between each pulse TS, there is developed a write pulse W, whose primary function is to over-write into the speech storage unit *sp* a signal present on a receive superhighway.

A call is established conventionally. A demand for a call is received at an odd time slot, say 3. A cord whose third store is free is assigned to the call. A free even time slot appropriate to route the call to its destination, say time slot 6, is chosen. The pair of time slots 3, 6 are then used exclusively for the call. By known means, represented by the arrow 26 in FIG. 3, "3" is written into the pairing memory *p* appropriate to the time slot 6, that is, into the pairing memory *p* that is read out at time slot 5.

The established call is maintained conventionally, the counter C cycling continuously. At each even time slot, the gate *g*1 opens, and the counter C advances from one odd number to the next odd number. Thus at time slot 2, the gate *g*1 opens, and the counter C advances from the count of "1" to the count of "3." At time slot 3, the gate *g*3 opens, followed by the gate *g*5, writing "3" into the selector S. The gate *g*8 being uninhibited, the gate *g*10 opens, and "3" is written into the decoder D, whence a signal is sent over the individual lead 22 to the store 3. In the store 3, the gates *g*11, *g*12, *g*13 are primed. With the pulse TS present, the read pulse R opens the gate *g*12. The supervisory unit *su*, the speech storage *sp* and the pairing memory *p* (which relates to a difference call) are read out, and their contents transferred to the staticiser ST. From the staticiser, the speech signals are passed by way of the lead 24 and the link L to the transmit superhighway and the originating party. When the pulse TS terminates, the signal $\overline{TS}$ appears. The write pulse W opens the gate *g*11, primes the gate *g*14, and over-writes into the supervisory unit *su* and speech storate unit *sp* signals received at the receive superhighway from the originating party. The originating party's receiver being off the receiver rest, the hold condition *h* is written into the supervisory unit *su*.

Time slot 4 now appears and advances the counter C from count "3" to count "5." Store 5 is now read out (in the manner just described) in relation to a call using time slot 5. The pairing memory *p* is read out at the same time in relation to the call under discussion which uses time slot 6. "3" having been written into this memory, "3" is read out from it and transferred to the pairing memory P of the staticiser ST. From the memory P, "3" is applied over lead 25 to the gate *g*4.

At time slot 6, the gate *g*4 opens, "3" is overwritten into the selector S and decoder D, whence a signal is sent over the individual lead 22 to the store 3. The store 3 is now read from and written into for the second time in the pulse cycle, the speech signals on this occasion being sent to and received from the called party. This action is represented by the broken lines in FIG. 3.

The cycle is repeated for the duration of the call. At the first time slot 3 after the originating party replaces his receiver on the receiver rest, the clear down condition *cl* is over-written into the supervisory unit *su*. The problem now arises of erasing the "3" from the pairing memory *p* relating to time slot 6. Among the known solutions to this problem is the provision of a clear down staticiser in which the "3" is stored for a cycle and compared with signals read from successive pairing memories *p* during this cycle. Erasure is effected when coincidence is detected. A disadvantage of this arrangement is that a separate clear down staticiser is required for each call that is being cleared down.

According to the invention, erasure is effected by means of a repeat selector RS, and by inhibiting the output of the selector S when erasure is required. The repeat selector RS is a temporary store conveniently of the same construction as the selector S. The repeat selector RS is controlled by the counter C through a gate *g*2. Thus at each odd pulse, the count of the counter C is written into both the selector S and the repeat selector RS. When erasure is required, an erase signal is applied to a gate $g6$ over a lead 27. The erase signal is developed when the supervisory unit SU of the staticiser ST is switched to the clear down condition CL on the reading of a supervisory unit *su* which is in the *cl* condition. At the gate $g6$, the erase signal is combined with an even pulse and the $\overline{TS}$ signal. The output of the gate $g6$ is used to inhibit the gate $g8$ and to apply input signals to two gates $g7$, $g9$. The gate $g7$ opens and the count in the repeat selector RS is passed by the gate $g10$ to the decoder D. With the gate $g9$ primed, the write pulse W causes a signal to be delivered over an erase bus bar 28 which is taken to all the stores of the cord. In each store, the bus bar 28 is connected to a gate $g13$, to which the store's individual lead 22 from the decoder D is also connected. When the gate $g13$ opens, zero is over-written into the pairing memory *p*.

Reverting now to the call already discussed, the originating party replaces this receiver on the receiver rest to terminate the call. At the next time slot 2, the gate $g1$ opens and the counter C advances to the count "3." At time slot 3, the count "3" is written into the selector S and the repeat selector RS. From the selector S, the count "3" is passed to the decoder D, whence an individual signal is sent to the store 3. In the store 3, the gates $g11$, $g12$, $g13$ are primed. In the presence of the pulse TS, the read pulse R opens the gate $g12$, and read out takes place as already described. The pulse TS terminates, and the signal $\overline{TS}$ appears. The write pulse W opens the gate $g11$ and primes the gate $g14$. There being no speech signal from the originating party, the priming of the gate $g14$ is ineffective as far as speech is concerned. But a signal is received indicating that the originating party has cleared down. This signal passes the gate $g14$ and sets the supervisory unit *su* to the clear down condition *cl.* At time slot 5, the count "5" is present in both the selector S and the repeat selector RS. With the count "5" in the selector S, the pairing memory *p* relating to time slot 6 is read out. In the present case, the count "3" is read out. The count "3" is applied by the memory P and the lead 25 to the gate $g4$ as previously described. At time slot 6, the gate $g4$ opens in the presence of the pulse TS. The gate $g6$ is partly primed. The opening of the gate $g4$ passes the count "3" to the selector S and thence to the decoder D whence, for the second time in the cycle, an individual signal is sent to the store 3, priming the gates $g11$, $g12$, $g13$ in the store 3 as already described. The read pulse R opens the gate $g12$ and reads out the clear down condition *cl* from the supervisory unit *su*, causing the supervisory unit SU of the staticiser ST to switch to the CL condition. With the unit P in the CL condition, a signal is delivered over lead 27 which causes the gate $g6$ to be fully primed. The pulse TS now terminates. At this juncture it will be recollected that the selector S contains the count "3" which was written therein when the gate $g4$ opened. The repeat selector RS, however, still stands at the count "5", the count appropriate for reading the pairing memory *p* relating to time slot 6. The signal $\overline{TS}$ now appears. The gate $g6$ opens, inhibiting the gate $g8$ and priming the gate $g9$. The gate $g7$ opens, being already primed by the output of the repeat selector RS. The count "5" is therefore passed from the repeat selector RS, by the gates $g7$, $g10$, to the decoder D, whence an individual signal is sent to the store S. In the store S this signal primes the gates $g11$, $g12$, $g13$, the gate $g13$ driving access to the pairing memory *p* relating to the time slot 6. The write pulse W now appears at the gate $g9$, which opens and applies a signal to the bus bar 28. In the store 5 the primed gate $g13$ opens, delivering a signal which is used to overwrite zero into the pairing memory *p*.

An advantage of erasure in this manner is that if a spurious signal appears on lead 25 and causes the selector S to assume a false count, the consequent output of the selector S is suppressed at the inhibit gate $g8$. The false count itself is over-written at the next opening of the gate $g3$.

I claim:

1. A telecommunication exchange which includes a receive and a transmit time-shared superhighway operated on a common cycle of time pulses, and at least one cord comprising a store corresponding to each odd time slot of the cycle, each store having a pairing memory relating to the even time slot following the odd time slot to which the store corresponds, a call through the exchange requiring an odd time slot, an even time slot and a store; said cord comprising a cyclic counter having a stage corresponding to each store of the cord, a selector means for storing a count supplied by the counter, and a decoder responsive to a count supplied by the counter to the selector to read during an odd time slot the store identified by the count, the selector means being also capable of storing a further count delivered thereto from a pairing memory on the read out of a store, the decoder being also responsive to the further count to read, during the even time slot following the odd time slot in which the further count was read out, the store identified by the further count; said cord comprising a repeat selector for storing a count supplied by the counter to the selector, and pairing erasure means responsive to an erase signal read from a store during an even time slot to inhibit the response of the decoder to said further count, to cause the decoder to respond to the count stored in the repeat selector, and to deliver a signal to the stores of the cord whereby zero is written into the pairing memory of the store identified by the count in the repeat selector.

* * * * *